Patented Aug. 9, 1938

2,126,555

UNITED STATES PATENT OFFICE 2,126,555

PROCESS FOR THE TREATMENT OF SOLUTIONS OF COLLOIDAL AND CRYSTALLOIDAL NATURE, AND IN PARTICULAR OF SWEET JUICES AND RESIDUAL WATERS

Emile Joseph Hugel, Etrepagny, France

No Drawing. Application July 30, 1935, Serial No. 33,914. In France August 4, 1934

5 Claims. (Cl. 210—2)

This invention relates to a special treatment of sweet juices (beet and cane juices, grape juice, etc.) and other solutions (residual waters, etc.) for purifying and stabilizing them.

The greater part of the impurities contained in sugar-refinery juices, as moreover in all vegetable juices, are constituted by organic matters (albumen and pectic matters). These substances are found in these juices in the colloidal state, which moreover appears to be their normal state. Now, it is known that the stability of a colloidal system depends on the electric charge of the micelles, and that the electric charge of the micelles is itself consecutive to the electrolytes which accompany it.

The colloids contained in vegetable juices are reversible, that is to say they can be negative or positive, according to the nature of the electrolyte which is in their presence. Now, as these phenomena are ruled by the laws applied in electricity, it will be understood that the colloids contained in sugar-refinery juices have the same electric sign; they can therefore reciprocally flocculate since two electricities of the same sign repulse each other. Colloidal micelles are very small; upon filtration, they clog the canvas of the filters, so that it is impossible to rationally eliminate them.

This difficulty can be overcome if the electric charges of colloidal micelles are neutralized.

The actual state of the art provides several means for that purpose; some of them are based on the introduction of an electrolyte serving to modify the stability of the colloidal systems, and others are based on the reciprocal action of colloidal micelles having opposed electric charges.

Among electrolytes most commonly used in sugar manufacture are to be found sulphurous acid, lime and carbonic acid. Although their action is very important, they can cause, in some cases, and when normal conditions are exceeded, reverse effects. With an increase of electrolyte, the electric sign of colloids can be reversed, so that instead of flocculating the micelles, their stability is increased.

In the reciprocal action of colloids, the elements most frequently employed, either individually, or together, are alumina and silica; these hydrosols are obtained by starting from an alumina or silica gel.

Now, some elements such as alumina, silica, etc., prepared by simple peptization, even in presence of formic aldehyde, are more or less reversible hydrosols. They can therefore change the charge, particularly in presence of stable colloids, such as albumen. In this case, they are stabilized and can only be partially eliminated by the subsequent treatment.

For eliminating these inconveniences, the present invention concerns the use of an irreversible colloidal solution, on which, albumen and the other substances being in the colloidal state in the juice, have no stabilizing action.

The invention has for its object the preparation and industrial application of a colloidal product having the property of eliminating the inconveniences indicated above and of obtaining particularly advantageous results.

This colloidal product, added to the raw juice issuing from the diffusing apparatus or from the cane mill, causes a flocculation of the colloids having an electric sign opposed to that of the reagent; this results in the formation of a precipitate easy to separate.

Normally, and without the use of the colloidal reagent, the isoelectric point of the colloids of the juice approximates that of albumen pH=4,4.

Now, for such a high concentration in H ions, an important inversion of saccharose will occur.

This inconvenience is avoided by the use of the colloidal reagent. It is known, in fact, that in the reciprocal action of two colloids of reverse sign, flocculation takes place long before the isoelectric point is reached. [Hardy Journ. of Physiol. 24.288–304 (1899)]. Calecki [ Zeit. f. an- org. chemie 74.174–206 (1912) ] has moreover found that the flocculating action of a colloid is so much the greater as its dispersion is great.

According to the invention, a sulphite, hyposulphite of soda for instance, is so treated as to obtain a sulphur hydrosol.

On the other hand, a graphite in the colloidal state is prepared so as to obtain it with its maximum dispersion.

These two colloids are mixed together so as to obtain a homogeneous mixture.

Example 50 grams hyposulfite of soda ($Na_2S_2O_3 + 5H_2O$) are dissolved in 100 cubic centimeters of water. 70 cubic centimeters of concentrated sulfuric acid ($d$=about 1.840) are then slowly introduced into this solution. A very thick, turbid and sulfur yellow suspension is thus obtained.

When this suspension is cooled to about 25° C., it is filtered on a filter of glass wool or asbestos. The flakes of sulfur remaining on the filter are then dissolved in the water. This suspension then assumes a milky or lacteal appearance of a yellowish color; it is nevertheless still very impure since it contains an appreciable quantity of $Na_2SO_4$.

The following method is carried out for purifying the said suspension:

There is introduced in the sulfur hydrosol about 1 to 2% of NaCl, which causes the flocculation of the sulfur. After decantation, the flocculate is separated from the liquid by filtration whereupon the flocculate of sulfur is again put in suspension in the water. Common salt is again introduced and the flocculate is separated by filtration and this operation is repeated 5 to 6 times. Owing to these successive treatments, a very pure sulfur hydrosol is obtained which contains only very small quantities of NaCl (about 0.05%) as impurity, see Bibliography—Pauli Valko—Kolloidchemie or colloidal chemistry pages 561–62.

If it is desired to prepare the carbon hydrosol simultaneously, the sulfur hydrosol thus obtained is mixed with about 0.1 to 1% of formol (or any one of the substances phosphorus, tannin, and sodium bisulfite), whereupon there are immersed in this liquid two carbon rods which are connected to a source of continuous current of 80 volts, 6 to 8 amperes. By bringing the two rods together, an arc is formed in the midst of the sulfur hydrosol which disperses the carbon in the hydrosol. The presence of the formol or one of the other substances, phosphorus, tannin or bisulfite, prevents the enlargement of the micelles of carbon thus dispersed and also imparting to the whole a certain stability without which there would be a spontaneous flocculation between the colloid of sulfur and the colloid of carbon. By previously weighing the two rods, it is possible to ascertain the quantity of carbon thus dispersed. However, this quantity of carbon must not exceed 15% without affecting the stability of the entire colloidal system of the hydrosol.

The hydrosol thus obtained is ready for use.

The applicant recommends, simply by way of indication, the following formula:

| | Percent |
|---|---|
| Sulfur in the colloidal state | 35 to 50 |
| Colloidal carbon (graphite) | 15 to 8 |
| Reducers and stabilizers for micelles, such as phosphorus, tannin, formic aldehyde or $NaHSO_3$ (about) | 1 |
| Water | 41 to 49 |

The mixture thus constituted can vary in the numerical indications above mentioned without departing thereby from the scope of the invention, or these two sols can be employed separately.

To the juice treated with this reagent in the proportion of 30 to 350 grams per 1,000 litres of beet or cane juice is subsequently added a small quantity of lime or of any other substance producing the same effect, in order to bring the pH to a given value. The excess of lime or of substance which has been used for this modification of the pH, is subsequently eliminated by an addition of phosphoric acid or of any other substance having the same neutralizing effect.

These operations effected at suitable temperatures immediately allow filtration by means of the usual filter-presses.

The use of this reagent reduces the utilization of lime from 60 to 100% and eliminates the use of the lime kiln during the season whilst simplifying the subsequent operations, by giving stable and purer juices.

What I claim as my invention and desire to secure by Letters Patent is:

1. Process for the treatment of solutions of colloidal and crystalloidal nature, which consists in adding to the solution to be treated a mixture of colloidal sulfur and colloidal graphite in a proportion varying from 30 to 350 grams per 1000 liters of solution, in heating the solution thus treated and alkalizing it, in subsequently reducing the alkalinity by adding an acid and in raising the whole to a temperature exceeding 80° C. and in finally filtering.

2. Process for the treatment of solutions of colloidal and crystalloidal nature which consists in adding to the solution to be treated a mixture of colloidal sulfur and colloidal graphite in a proportion varying from 30 to 350 grams per 1000 liters of solution, in heating the solution thus treated and in alkalizing it, in subsequently reducing the alkalinity by adding phosphoric acid, in raising the whole to a temperature exceeding 80° C. and in finally filtering.

3. Process for the treatment of solutions of colloidal and crystalloidal nature, which consists in adding to the solution to be treated a mixture of colloidal sulfur and colloidal graphite with addition of a small quantity of formol.

4. Process for the treatment of solutions of colloidal and crystalloidal nature, which consists in adding to the solution to be treated a mixture of colloidal sulfur and colloidal graphite with addition of a small quantity of sulfite of soda.

5. Process for the treatment of solutions of colloidal and crystalloidal nature, which consists in adding to the solution to be treated a mixture of colloidal sulfur and colloidal graphite with addition of a small quantity of tannin.

EMILE JOSEPH HUGEL.